United States Patent [19]

Southworth et al.

[11] Patent Number: 5,955,719
[45] Date of Patent: Sep. 21, 1999

[54] DATA/PEN WELL

[75] Inventors: Robert Southworth, Pantucket, R.I.; Frank Mercurio, Wallingford, Conn.; Paul E. Linderson, Warwick, R.I.

[73] Assignee: A. T. Cross Company, Lincoln, R.I.

[21] Appl. No.: 08/994,684

[22] Filed: Dec. 19, 1997

[51] Int. Cl.$^6$ ..................................................... G06K 7/10
[52] U.S. Cl. .................. 235/454; 235/375; 235/472.03; 235/462; 235/455; 235/454; 235/456; 382/313
[58] Field of Search .................................. 235/375, 472, 235/462, 455; 382/313

[56] References Cited

U.S. PATENT DOCUMENTS

| | | | |
|---|---|---|---|
| 5,065,003 | 11/1991 | Wakatsuki et al. | 235/472 |
| 5,171,977 | 12/1992 | Morrison | 235/375 |
| 5,231,278 | 7/1993 | Kuo | 235/472 |
| 5,479,001 | 12/1995 | Kumar | 235/472 |
| 5,506,394 | 4/1996 | Plesko | 265/472 |
| 5,550,362 | 8/1996 | Sherman | 234/455 |
| 5,574,804 | 11/1996 | Olschafskie et al. | 382/313 |
| 5,576,530 | 11/1996 | Hagerty | 235/472 |
| 5,656,805 | 8/1997 | Plesko | 235/472 |
| 5,691,528 | 11/1997 | Wyatt et al. | 235/462 |

*Primary Examiner*—Anita Pellman Gross
*Assistant Examiner*—Daniel Felten
*Attorney, Agent, or Firm*—Notaro & Michalos P.C.

[57] ABSTRACT

A data well arrangement for storing data and for interfacing with a writing implement having a writing end with a writing tip and data transfer end with a data transfer tip is described. The data well arrangement has a housing with an inlet opening for receiving an end of the implement. A data reader resides in the housing for facing the data transfer tip to exchange data with the implement when the data transfer end of the implement is received in the opening. A shutter in the housing is engageable with an engagement portion of the implement for moving of shutter between a writing end storage position in which the data reader is inaccessible, and an interface position in which the data reader is accessible to the data transfer tip with the shutter being engaged by the engagement portion of the implement, only when the data transfer end is received in this opening.

10 Claims, 5 Drawing Sheets

DATA/PEN WELL

FIELD AND BACKGROUND OF THE INVENTION

The present invention relates in general to pen shaped data acquisition or data generating implements, and in particular, to a new and useful pen stand or well, which also functions as a data transfer station for use with the implement.

Hand-held scanners are known, which contain electronics and interfaces capable of scanning printed data on a page, such as bar codes and the like. One product available from Symbol Technologies, Inc. is referred to as the Datawand IIB/III, and includes an elongated hand-held scanner which is used to scan and collect data, and a data well which has an opening for receiving the scanner and for downloading the data. For this purpose, the scanner has an optical reader at its end which functions as an optical read/write head that is brought into face-to-face relationship with an optical reader in the well, in order to upload data from the scanner, and download it to the data well.

The Symbol scanner has no ability to act as a pen for writing on a surface, nor does it have the appropriate shape or size to serve as a writing implement. No special measures are taken to protect the optical reader within the data well either, since it is contemplated that only the scanner end will be inserted into the well.

SUMMARY OF THE INVENTION

An object of the present invention is to provide a data well for a hand-held data acquisition implement, where the implement is also capable of serving as a writing instrument and where the data well also serves as a stand or pen well for storing the writing/data implement. Writing means such as a ball point pen and cartridge, lead pencil and cartridge or other writing tip arrangement, is provided at one end of the implement, while a data transfer tip, such as the optical reader, is provided at an opposite end of the implement.

One of the problems to be overcome by the present invention was to keep the optical reader in the data/pen well, clean and undamaged despite insertion of the implement into the well with the writing tip down.

The data/pen well of the present invention has been designed so as to satisfy one set of mechanical requirements when the optical reader end of the implement is inserted into the well, and to satisfy a different set of mechanical requirements when the writing end of the implement is inserted for storage of the implement in the sense of a pen stand.

According to the present invention, a shutter automatically remains over the optical reader in the well and is shaped to receive and store the writing end of the writing implement. In this configuration, the well acts as a pen well or pen stand.

The shutter is designed, however, so that it automatically moves aside when the optical reader end of the implement is inserted into the well, allowing access to the optical reader in the well and permitting proper alignment of the optical readers on the implement and well, for achieving data transfer.

In this way, the data/pen well provides protection for the optical reader or readers in the well, keeping them clean and undamaged, while allowing the optics of the implement to engage the reader when the correct end of the implement is inserted into the well. No user involvement is necessary since the well automatically receives the writing end of the pen for serving as a storage facility, and automatically exposes the optical readers when serving a data transfer function.

Accordingly, another object of the present invention is to provide a data well which can also serve as a pen stand for storing a writing instrument in a point down position, without allowing dust or ink to settle on or be applied to the internal optical components of the stand, nor risking damage to the optical components.

A further object of the present invention is to provide a data well which can serve as an upload station when the writing implement is inserted with its optical reader end down. Insertion of the implement automatically pivots the shutter away from the reader or readers in the well.

A further object of the present invention is to utilize a pocket clip present on the writing instrument as the portion of the implement which pushes the shutter aside. This avoids wear and tear on other parts of the pen which are more susceptible to wear and damage than the pen clip which is advantageously made of metal.

A further object of the present invention is to provide a data/pen well for use with a dual purpose writing/data implement, in a manner which is entirely transparent to the user. The simple act of inserting the optical reader end of the implement into the stand, presents the appropriate mechanisms in the stand to the reader. Conversely, the insertion of the implement, writing end down, into the well, automatically allows the well to serve as a stand, without endangering the delicate optical elements of the reader in the stand.

Accordingly, another object of the present invention is to provide a data well for storing and interfacing with a writing implement having a writing end with a writing tip and a data transfer end with a data transfer tip, the data well comprising: a housing having an inlet opening for receiving an end of the implement; a data reader in said housing for facing the data transfer tip to exchange data with the implement when the data transfer end of the implement is received in said opening; and shutter means in said housing and engageable with an engagement portion of the implement for movement of said shutter means between a writing tip storage position in which said data reader is inaccessible, and an interface position in which said data reader is accessible to said data transfer tip, said shutter means being engaged by said engagement means of the implement when the data transfer end is received in said opening.

In the preferred embodiment of the invention, the shutter means comprises a shutter which moves over a fixed data reader in the housing, as opposed to mounting the data reader to the shutter means. This is to avoid the bending of wires which are necessarily connected to the data reader. In the broader sense however, the invention contemplates both a fixed data reader and a data reader mounted to the shutter means for movement with insertion of the implement. In that form of the invention, the shutter means moves the reader into position to interface with the data transfer end of the implement.

In a preferred form of the implement, the data transfer end and the writing end are opposite from each other. Although various engagement portions can be provided on the implement, in a preferred form of the invention, the pocket clip attached to the implement is used as the engagement portion for moving the shutter means.

A still further object of the present invention is to provide a data well which is simple in design, rugged in construction and economical to manufacture.

The various features of novelty which characterize the invention are pointed out with particularity in the claims

3 annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
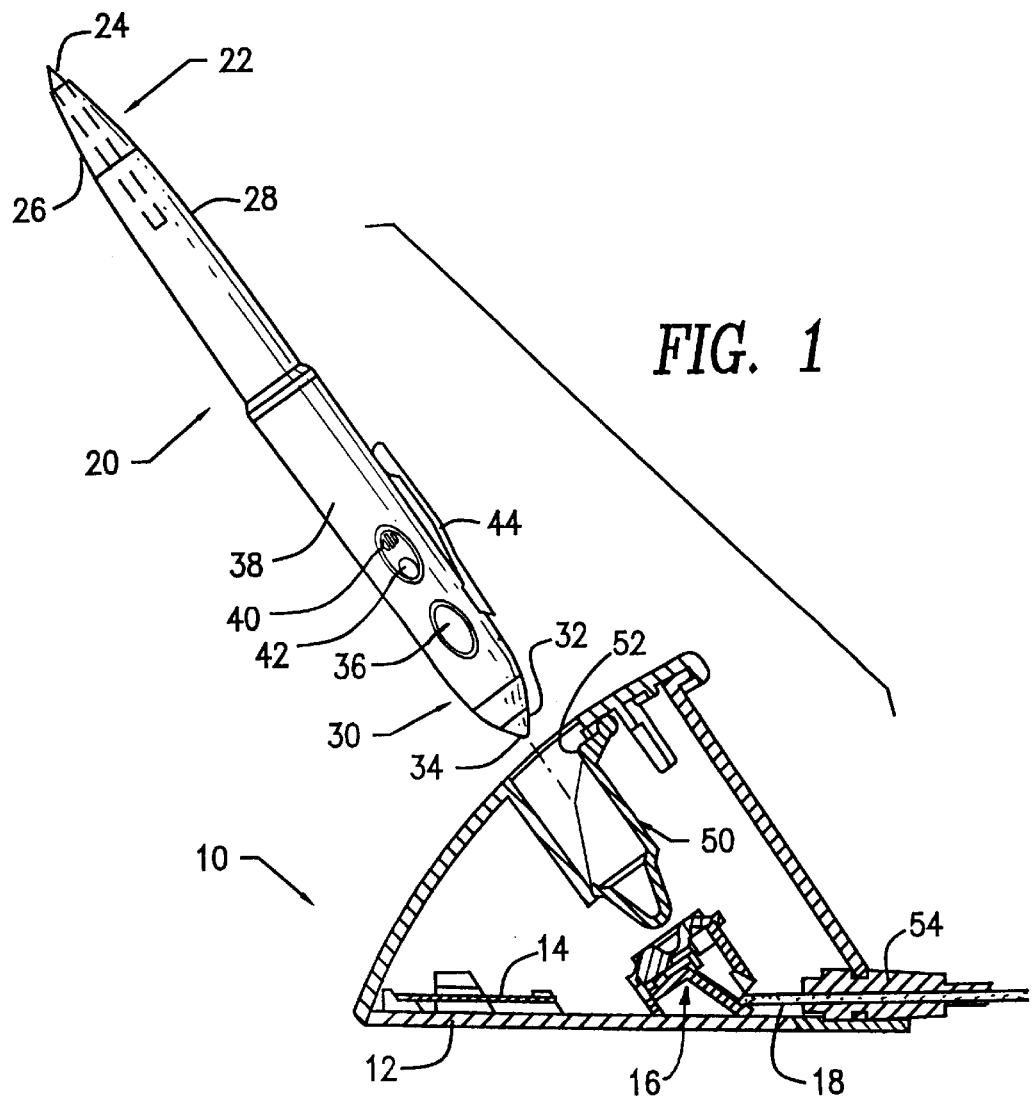
FIG. 1 is a side sectional view of the data well of the present invention with a side elevational view of an implement of the present invention.

Referring to the drawings in particular, the invention embodied in FIG. 1 comprises a data well generally designed 10 for storing and for interfacing with a writing implement generally designated 20, the writing implement having a writing end 22 with a writing tip 24 and an internal mechanism (not shown) which can extend and retract writing tip 24 by rotation of an end portion 26 of the implement, with respect to a forward barrel 28. Writing tip 24 is advantageously in the form of a ballpoint pen cartridge with ballpoint writing end, pressfit into the retraction mechanism in forward barrel 28. Implement 20 also has an opposite data transfer end 30 which has a tapering end portion that tapers to a transparent polycarbonate window 32 which carries a transparent sapphire lens 34. Electronic circuits and a power supply (not shown) are mounted within the implement, generally within the rear barrel 38. The implement can be used by holding it in the hand and sweeping the lens 34 across a bar code while a push button 36 is pressed. A speaker 40 and an LED 42 are provided to give the user feedback signals to indicate ready conditions, completion of the reading of the bar code and the like.

Sapphire lens 34 with window 32 are collectively referred to here as a data transfer tip at the data transfer end 30 of the implement 20. A pocket clip 44, preferably made of metal, is connected to the rear barrel 38 and serves as a conventional pocket clip. Clip 44 also has the function of a cam however, which is capable of riding along a cam follower 52 on a shutter 50 pivotally mounted within a housing 12 of the data well 10. Housing 10 also includes circuitry such as a circuit board 14 which is connected to a data reader generally designated 16 having a window and light source for interfacing with the window and lens of the implement 20, for downloading data stored on the implement. This data is advantageously bar code data which has been read and stored in the electronics in the implement 20 but can also be other data read by or generated by implement 20 and stored for being downloaded at some future time through the interface formed by engaging the data transfer tip 32, 34 to the data reader 16. A cable 18 connected through a grommet 54 at the back of housing 10 connects the reader 16 to a computer or other device for retrieving the downloaded information. The electronics and readers on the implement and in the housing, for the bar code reading function, is known, for exmple, in the scanners of Symbol Technologies, Inc.

Figure 2:
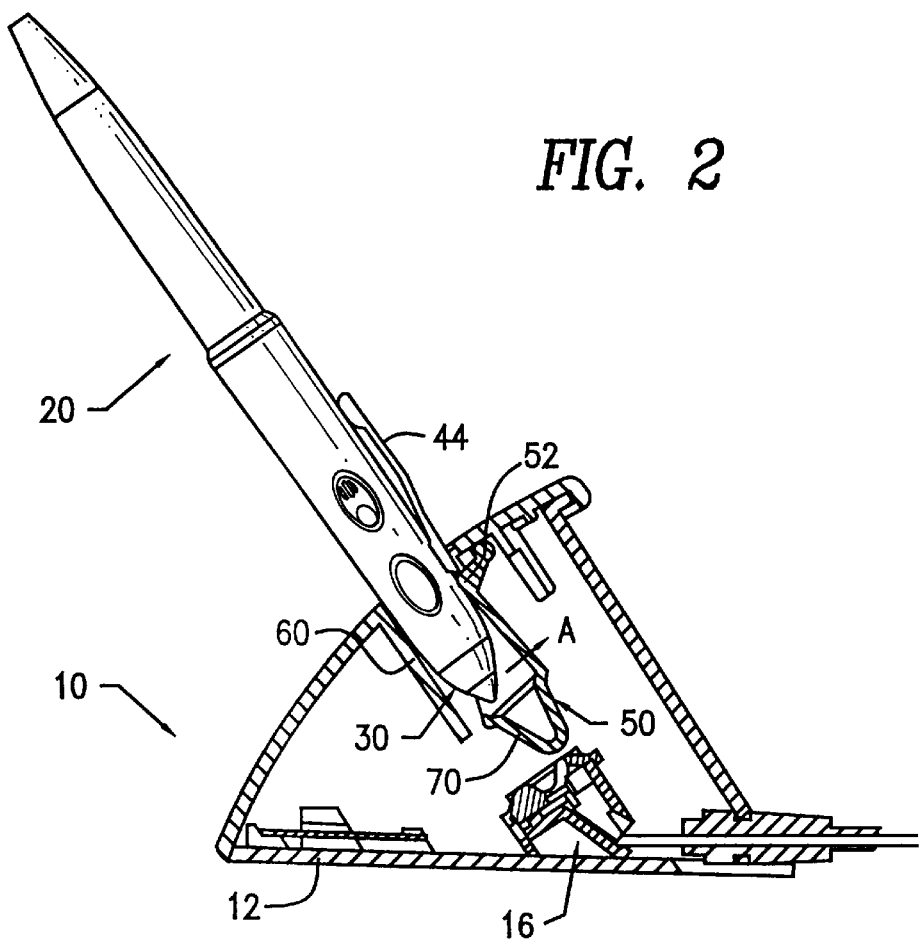
FIG. 2 is a view similar to FIG. 1 of a data transfer end of the implement as it is being inserted into an inlet opening in the housing of the data well.

Turning now to FIG. 2, data transfer end 30 has just been introduced into an inlet opening 60 in housing 12. The upper end of clip 44 has just engaged the cam follower 52 causing shutter 50 to begin to pivot in the direction of arrow A within housing 12. Note that in FIGS. 1 and 2, a lower conical enclosed cup 70 of shutter 50 was positioned over the data reader 16, protecting the reader from dirt and dust and also protecting it from being engaged by the writing end 22 and thus potentially being damaged or marked with ink by the writing tip 24.

Figure 4:
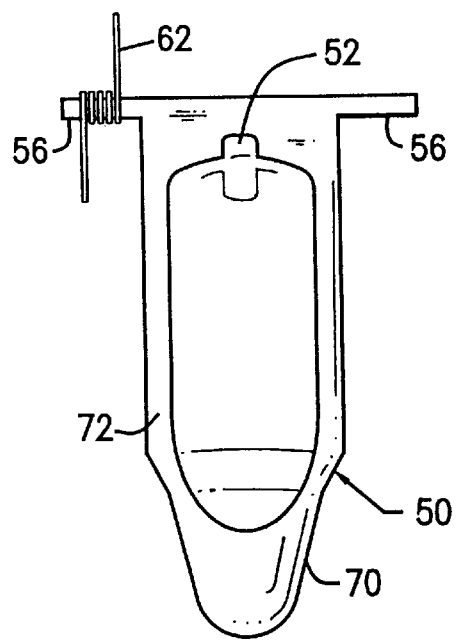
FIG. 4 is a front elevational view of a preferred embodiment of the shutter according to the present invention.
Figure 3:
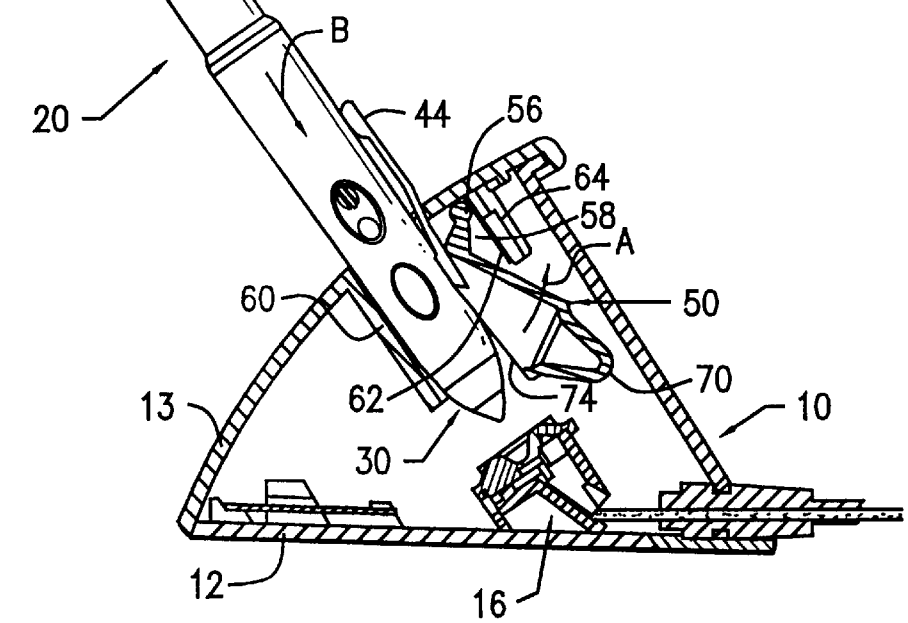
FIG. 3 is a view similar to FIG. 2 showing the position of a shutter means in the housing as the implement is pushed deeper into the inlet opening.

As shown in FIG. 3, as implement 20 is further moved into inlet 60, clip 44 pivots shutter 50 further away from the data reader 16. Implement 20 is being moved in the direction of arrow B. The alignment between the central axis of implement 20 and the central axis of reader 16 is maintained because inlet opening 60 is semi-cylindrical and serves to cradle the data transfer end 30. Shutter 50 pivots on a pair of trunions 56 which are cradled in journals 58 formed on the internal side of a cover 13 of the housing 12. As shown in FIG. 4, a spring 62 having a pair of outwardly extending arms, is engaged around one of the trunions 56 or maybe engaged around both of the trunions 56, and are wedged against a stop 64 in housing 12, to bias the shuttle to rotate in a direction opposite from arrow A, maintaining the shutter in the position shown in FIG. 1 unless the shutter is pushed aside by the clip 44 as the data transfer end 30 is inserted into the inlet opening 60.

FIG. 4 also illustrates the conical cup 70 at the lower end of shutter 50 which extends downwardly from a cylindrical portion 72 which is only a partial cylinder, the rest having been cut away along a diagonal plane 74 shown in FIG. 3.

Advantageously, cam 52 is formed as a slight enlargement of the plastic material making up the shutter 50 to avoid having any other portion of the implement 20 other than clip 44, come into contact with the shutter. This is because the metal clip 44 is better able to resist wear and damage than the remainder of the body of implement 20 which is made of plastic material. The walls of housing 12 are also made of plastic material.

Figure 5:
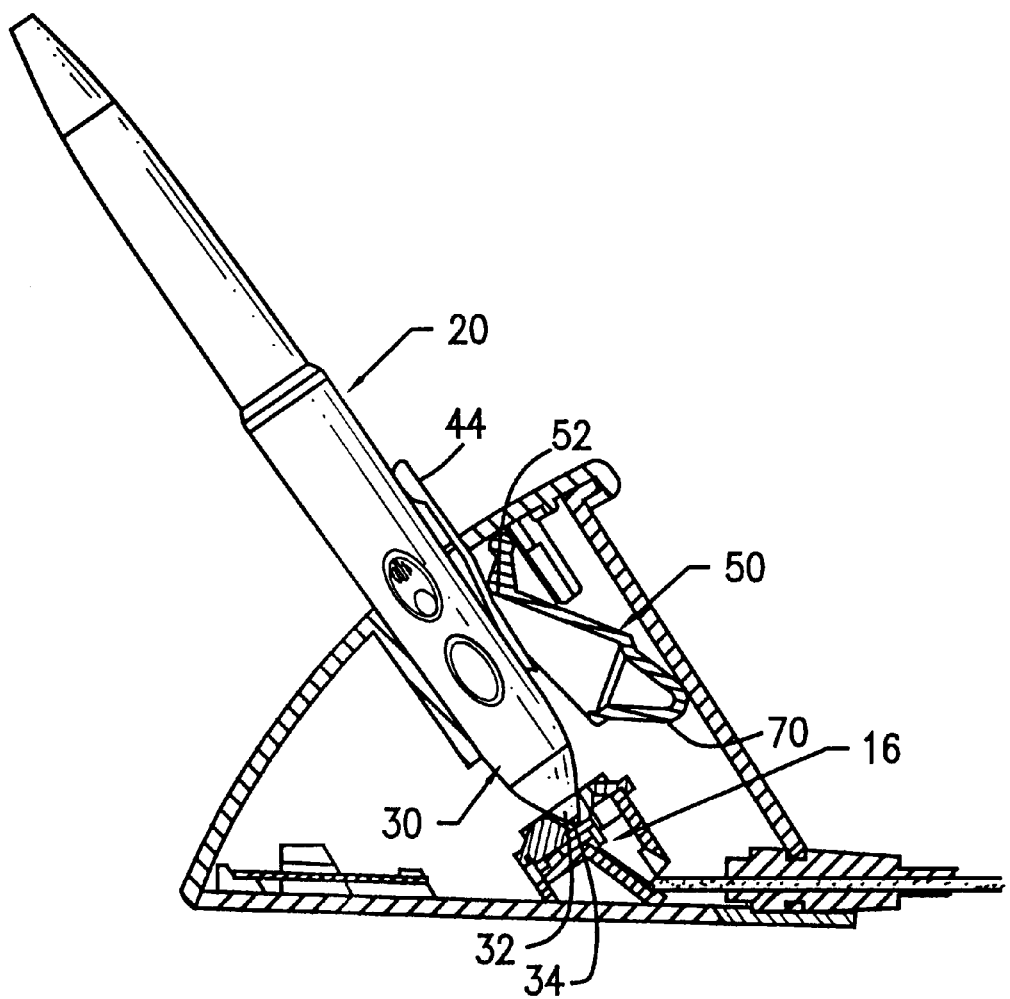
FIG. 5 is a view similar to FIG. 3, showing the data transfer end of the implement fully engaged in the housing and in and interface position with respect to a data reader in the housing.

FIG. 5 illustrates the fully seated position for implement 20 in its data transfer end-down position, with the interface position established between the data transfer tip 32,34 and the data reader 16. Shutter 50 is in its fully pushed aside position with cam follower 52 having been pushed to its maximum extent by the incline surface of the cam, in the form of the metal clip 44.

Figure 6:
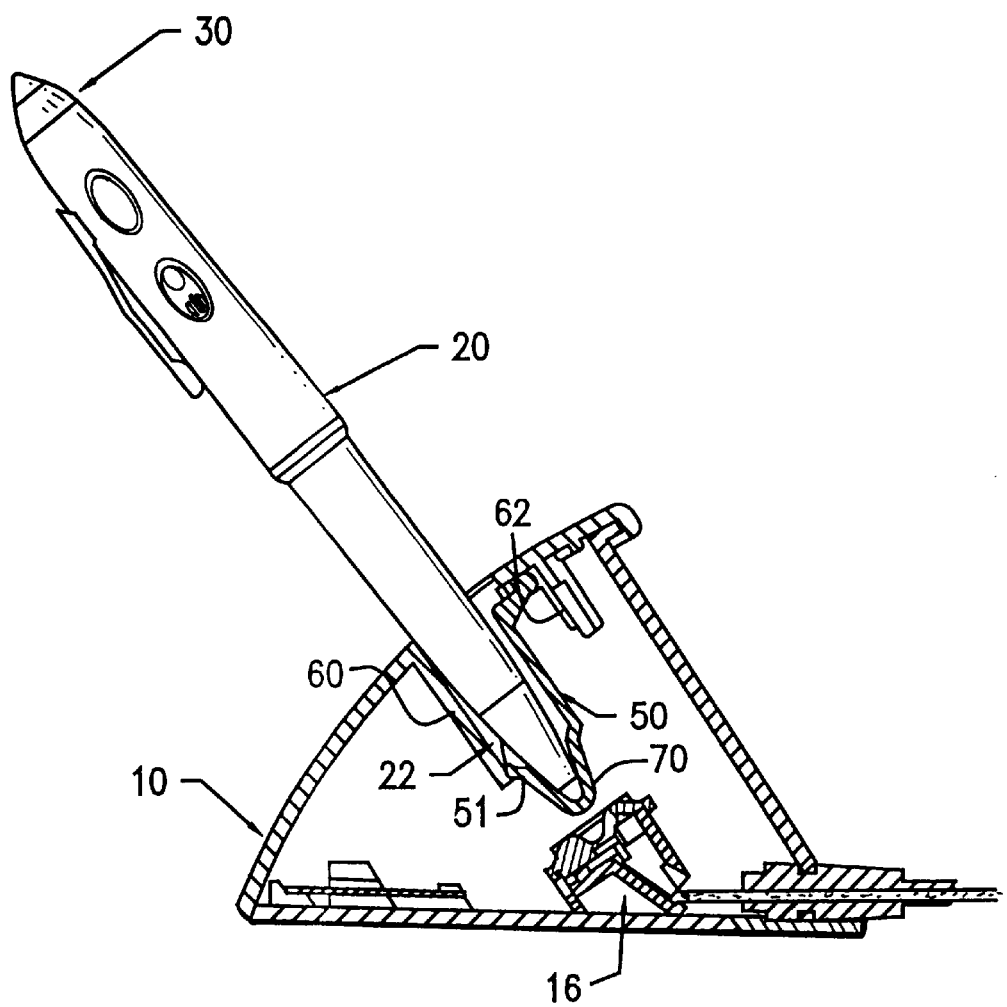
FIG. 6 is a view similar to FIG. 2 showing the data well used as a pen stand for receiving the writing end of the implement, while keeping the writing end away from the data reader.

FIG. 6 illustrates the pen stand or pen well configuration of the invention with shutter 50 being biased by spring 62 so that its forward end 51 engages against the inlet opening member 60 and the conical cup 70 receiving the writing end 22. Whether the writing tip 24 is extended or not (the retracted position for the writing tip is shown in FIG. 6) no damage or application of ink onto the delicate optical data reader 16 is possible.

Accordingly, the user of the implement 20 can freely download information stored on the implement to the data well 10 by inserting the data transfer end 30 and automatically establishing the interface position. If the implement 20 is then to be stored in the well 10, using the well as a simple pen stand, the implement is simply inserted, writing end down, into the opening 60 which automatically engages the shutter 50 in its covering and protecting position, seating the writing tip in the cup 70.

While a specific embodiments of the invention has been shown and described in detail to illustrate the application of the principles of the invention, it will be understood that the invention may be embodied otherwise without departing from such principles.

What is claimed is:

1. A data well arrangement for storing and interfacing with a writing implement having a writing end with a writing tip and data transfer end with a data transfer tip, the data well arrangement comprising:

a housing having an inlet opening for receiving an end of the implement;

a data reader in said housing for facing the data transfer tip to exchange data with the implement when the data transfer end of the implement is received in said opening; and shutter means in said housing and engageable with an engagement portion of the implement for moving of said shutter means between a writing end storage position in which said data reader is inaccessible, and an interface position in which said data reader is accessible to said data transfer tip, said shutter means being engaged by the engagement portion of the implement only when the data transfer end is received in said opening.

2. An arrangement according to claim 1 wherein said shutter means is pivotally mounted to said housing, said data reader being fixed in said housing below said shutter means when said shutter means is in said writing end storage position.

3. An arrangement according to claim 2 wherein said shutter means has a lower cup adapted to receive the writing end of the implement, said cup covering said data reader when said shutter means is in said writing end storage position.

4. An arrangement according to claim 3 including biasing means connected to said shutter means for biasing said shutter means toward said writing end storage position.

5. An arrangement according to claim 4 including, in combination with said housing, a writing implement having a writing end with a writing tip and a data transfer end with a data transfer tip, said implement having an engagement portion for engaging said shutter means for moving said shutter means between said writing end storage position and said interface position.

6. An arrangement according to claim 5 wherein said engagement portion comprises a pocket clip connected to said implement.

7. An arrangement according to claim 6 wherein said shutter means includes a cam follower engageable by said clip for pivoting said shutter means away from said writing end storage position and into said interface position.

8. An arrangement according to claim 1 including, in combination with said housing, a writing implement having a writing end with a writing tip at one end and a data transfer end with a data transfer tip at an opposite end, said writing implement having an engagement portion for engagement with said shutter means for moving said shutter means between said writing end storage position and said interface position when said data transfer end is inserted into said inlet opening.

9. An arrangement according to claim 1 wherein said shutter means comprises a shutter having a cylindrical portion with a diagonal plane and an end cup for receiving the writing end of the writing implement, said inlet opening comprising a semi-cylindrical member extending into said housing for cradling each end of said writing implement.

10. An arrangement according to claim 1 wherein said data reader comprises an optical data reader for interfacing with an optical data transfer tip.

\* \* \* \* \*